(12) United States Patent
Christoph (10) Patent No.: US 10,909,963 B2
(45) Date of Patent: *Feb. 2, 2021

(54) AUTOMATIC NOISE CONTROL (71) Applicant: Harman Becker Automotive Systems GmbH, Karlsbad (DE)

(72) Inventor: Markus Christoph, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 65 days.

This patent is subject to a terminal disclaimer.

(21) Appl. No.: 16/200,021

(22) Filed: Nov. 26, 2018

(65) Prior Publication Data

US 2019/0096382 A1  Mar. 28, 2019

Related U.S. Application Data (63) Continuation of application No. 15/476,634, filed on Mar. 31, 2017, now Pat. No. 10,157,606.

(30) Foreign Application Priority Data

Mar. 31, 2016 (EP) ..................................... 16163167

(51) Int. Cl.
*G10K 11/178* (2006.01)
*H04R 5/02* (2006.01)
(Continued)

(52) U.S. Cl.
CPC ...... *G10K 11/178* (2013.01); *G10K 11/17879* (2018.01); *G10K 11/17883* (2018.01);
(Continued)

(58) Field of Classification Search
CPC ........... G10K 11/178; G10K 11/17883; G10K 11/17879; G10K 2210/1282;
(Continued)

(56) References Cited

U.S. PATENT DOCUMENTS 6,506,153 B1 * 1/2003 Littek .................. A61B 5/0205
600/301
9,100,747 B2   8/2015 Murata et al.
(Continued)

FOREIGN PATENT DOCUMENTS

JP   2008205804 A  *  9/2008  ............... H04R 3/04
JP   2008205804 A     9/2008
(Continued)

OTHER PUBLICATIONS

Extended European Search Report for Application No. 20172182.6, dated Aug. 14, 2020, 5 pages.

*Primary Examiner* — Oyesola C Ojo
(74) *Attorney, Agent, or Firm* — Brooks Kushman P.C.

(57) ABSTRACT

Active noise control systems and methods are disclosed that include generating with a first sub-system, anti-noise that is configured to reduce or cancel noise occurring at a listening position. Generating with a second sub-system, anti-noise that is configured to reduce or cancel noise occurring at the listening position. The first active noise control sub-system has a higher robustness than the second active noise control sub-system.

17 Claims, 5 Drawing Sheets

(51) Int. Cl.
*B60N 2/879* (2018.01)
*B60N 2/427* (2006.01)

(52) U.S. Cl.
CPC .......... *H04R 5/023* (2013.01); *B60N 2/42709* (2013.01); *B60N 2/879* (2018.02); *G10K 2210/128* (2013.01); *G10K 2210/1282* (2013.01); *G10K 2210/3037* (2013.01); *G10K 2210/3046* (2013.01); *G10K 2210/3055* (2013.01); *G10K 2210/3221* (2013.01); *H04R 2499/13* (2013.01)

(58) Field of Classification Search
CPC ..... G10K 2210/128; G10K 2210/3037; G10K 2210/3046; G10K 2210/3055; G10K 2210/3221; G10K 11/004; G10K 11/16; G10K 11/26; B60N 2/879; B60N 2/42709; H04R 5/023; H04R 2499/13; B60R 16/02
See application file for complete search history.

(56) References Cited

U.S. PATENT DOCUMENTS

| | | | | |
|---|---|---|---|---|
| 9,517,732 | B2* | 12/2016 | Silzle | B60R 11/0217 |
| 9,595,253 | B2* | 3/2017 | Inoue | G10K 11/178 |
| 9,981,613 | B2* | 5/2018 | Ito | H04R 5/023 |
| 2004/0021350 | A1 | 2/2004 | House | |
| 2005/0117766 | A1 | 6/2005 | Ito et al. | |
| 2005/0207585 | A1* | 9/2005 | Christoph | G10K 11/17854 381/71.11 |
| 2006/0285697 | A1* | 12/2006 | Nishikawa | G10K 11/17835 381/71.1 |
| 2007/0057493 | A1 | 3/2007 | Ritzel et al. | |
| 2008/0159553 | A1 | 7/2008 | Copley et al. | |
| 2008/0181422 | A1* | 7/2008 | Christoph | G10K 11/17817 381/73.1 |
| 2008/0240456 | A1* | 10/2008 | Sakamoto | G10K 11/178 381/71.4 |
| 2009/0274320 | A1* | 11/2009 | Kino | G10K 11/178 381/94.7 |
| 2010/0189275 | A1* | 7/2010 | Christoph | H04R 3/005 381/66 |
| 2011/0206214 | A1 | 8/2011 | Christoph et al. | |
| 2012/0093344 | A1 | 4/2012 | Sun et al. | |
| 2014/0270322 | A1 | 9/2014 | Silverstein | |
| 2015/0010164 | A1 | 1/2015 | Christoph | |
| 2015/0249886 | A1* | 9/2015 | Haylett | G10K 11/178 381/71.4 |
| 2017/0178617 | A1 | 6/2017 | Christoph | |
| 2017/0287462 | A1 | 10/2017 | Christoph | |

FOREIGN PATENT DOCUMENTS

| | | |
|---|---|---|
| WO | 2004064448 A1 | 7/2004 |
| WO | 2009012500 A2 | 1/2009 |

* cited by examiner

AUTOMATIC NOISE CONTROL

CROSS-REFERENCE TO RELATED APPLICATIONS

This application is a continuation of U.S. application Ser. No. 15/476,634 filed Mar. 31, 2017, now U.S. Pat. No. 10,157,606, issued Dec. 18, 2018 which claims foreign priority benefits under 35 U.S.C. § 119(a)-(d) to EP 16163167.6 filed Mar. 31, 2016, which is hereby incorporated by reference in its entirety.

TECHNICAL FIELD

The disclosure relates to a system and method (generally referred to as a "system") for automatic noise control.

BACKGROUND

Automatic noise control (ANC) technologies have found their way into products, e.g., in the automotive industry. The technologies currently used in the automotive industry can be essentially split into two categories—narrow-band feed-forward control systems for combating engine noise, known as engine order control (EOC) systems, and broadband feed-forward control systems for reducing road noise, known as road noise control (RNC) systems. However, both types of systems may struggle with robustness issues so that there is a general need to improve the robustness of ANC systems particularly for automotive applications.

SUMMARY

An exemplary active noise control system includes a first active noise control sub-system and a second active noise control sub-system. The first active noise control sub-system includes a higher robustness than the second active noise control sub-system.

An exemplary active noise control method includes generating with a first sub-system anti-noise that is configured to reduce or cancel noise occurring at a listening position, and generating with a second sub-system, anti-noise that is configured to reduce or cancel noise occurring at the listening position. The first active noise control sub-system includes a higher robustness than the second active noise control sub-system.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead is placed upon illustrating the principles of the invention. Moreover, in the figures, like referenced numerals designate corresponding parts throughout the different views.

DETAILED DESCRIPTION

In practice, even EOC systems and RNC systems exhibit some weakness in terms of robustness and even when relying on signals from non-acoustical sensors such as revolution per minute (RPM) sensors or acceleration (ACC) sensors as noise reference input signals for their ANC algorithms. Generally, relying on such signal sources can eliminate robustness problems related to reference feedback paths as no time-varying room impulse response (RIR) changes from secondary sources to the reference sensors occur. Nevertheless, RIRs occur, subject to variations over time, on paths called "secondary paths" between the secondary sources (e.g., loudspeakers) and error signal sensors (e.g., microphones). Secondary path parameters can be measured only (once) when the whole system is in its "normal operational state" and these (once) measured "fixed" parameters are used under the assumption that they will not change much during real operation. But this is not always the case and once the difference between the fixed and actual secondary path parameters (especially their phase) exceeds a certain stability limit, the whole system will start to oscillate and as a consequence will become instable. To avoid such feedback, stability (robustness) measurements may be conducted to reliably determine when the system under investigation leaves the stable state of operation and enters into an instable state. Once an instable state has been detected, the task of the stability (robustness) measurements is more or less to deactivate the ANC system and thus avoid feedback.

Figure 1:
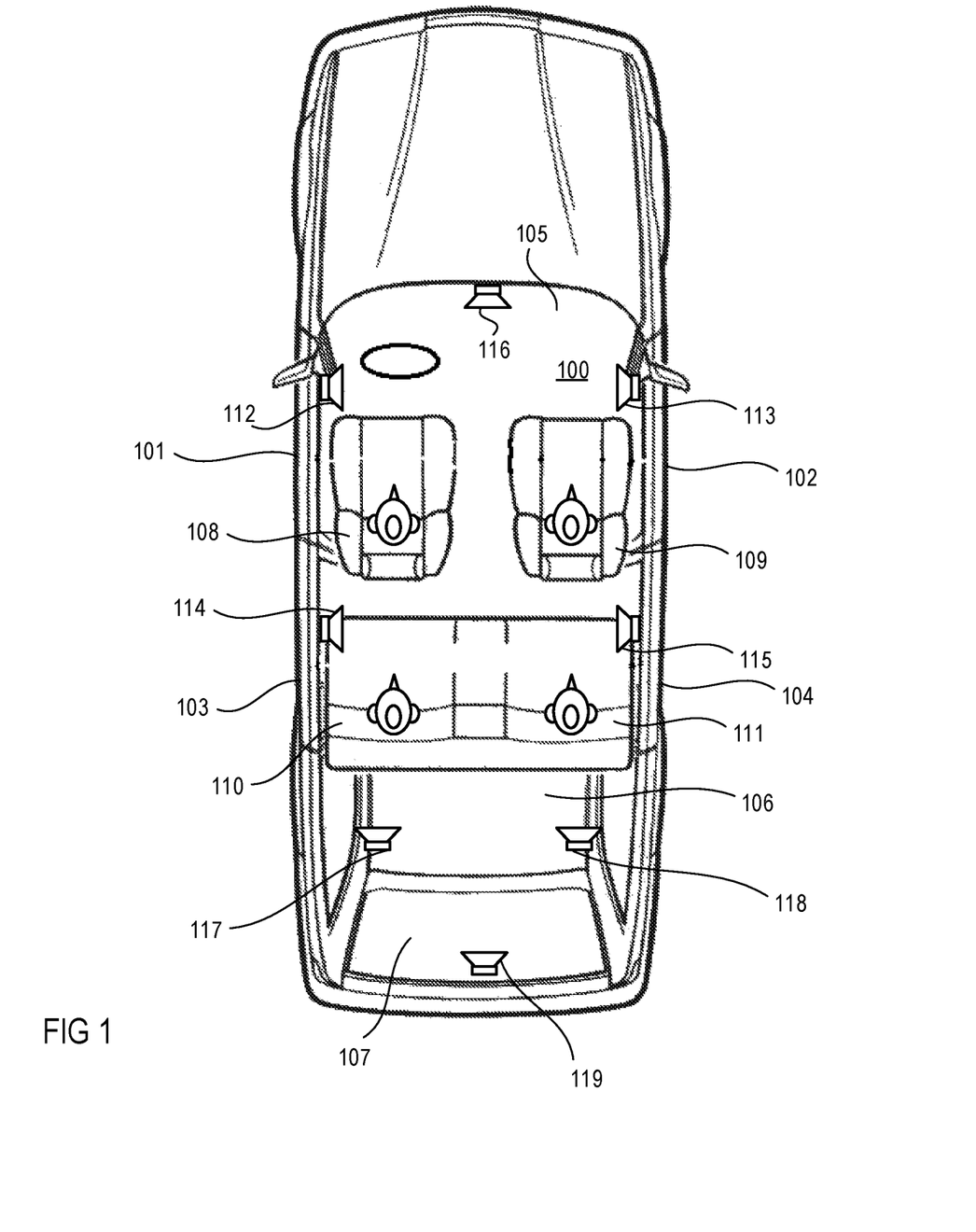
FIG. 1 is a top view of an exemplary setup of system loudspeakers in a vehicle interior.

Referring to FIG. 1, an exemplary ANC system in a vehicle such as, e.g., a car, may use at least parts of an already existing audio system 100, e.g., loudspeakers that are already installed in the vehicle and that cover a spectral area of interest, to evaluate what makes the secondary paths change so much that robustness issues may occur. The exemplary audio system 100 may include two front channels (e.g., a front left channel and front right channel) that include loudspeakers or groups of loudspeakers 112 and 113 which may be disposed in the front doors 101, 102 and which may include at least one of a woofer, midrange loudspeaker and tweeter. The audio system 100 may further include two rear channels (e.g., a rear left channel and rear right channel) that include loudspeakers or groups of loudspeakers 114 and 115 which may be disposed in the rear doors 103, 104 and which may include at least one of a woofer, midrange loudspeaker and tweeter. A loudspeaker or group of loudspeakers 116 for a further front channel is disposed on or in a dashboard 105 in the vehicle interior. Two loudspeakers or groups of loudspeakers 117 and 118 may be disposed in or on the rear shelf 106. The loudspeakers or groups of loudspeakers 116, 117 and 118 may include at least one of a woofer, midrange loudspeaker, and tweeter. Optionally, an additional subwoofer 119 may be disposed in a trunk 107 of the vehicle.

The already existing system loudspeakers 112-119 may deliver sufficient sound pressure level (SPL), especially at low frequencies, where the noise (e.g., originating from the engine and/or the road) to be reduced, has its highest energy content. As a consequence, loudspeakers with a large membrane or a high excursion coupled to a large volume may be required. Since the space in vehicles is limited, only certain positions exist where these requirements can be fulfilled. To do so, low-frequency loudspeakers (e.g., woofers) may be installed in the doors 101-104 of the vehicle and lowest-frequency loudspeakers (e.g., subwoofers) may be installed at the rear shelf 106 or trunk 107, or may be coupled to a chassis part of the vehicle (either centrally or in the frontal area). Alternatively or additionally, subwoofers may be disposed outside the vehicle interior and acoustically coupled to the vehicle interior.

Tests have shown that especially secondary paths from loudspeakers positioned as described above to error microphones which may be installed at the headliner close to each passenger's head or ears, as depicted in FIG. 1, are, for numerous reasons, prone to variations. For example, the secondary paths from the loudspeakers or groups of loudspeakers 112-115 installed in the doors 101-104 to the error microphones installed in the headliner will change, depending on whether a passenger is located in a certain seat 108-111 or not, due the shading effect of the passenger's legs. Therefore, stability may vary depending on the occupancy of the vehicle. In another example, a subwoofer is mounted in the trunk and the secondary paths change, depending on the degree to which the trunk is filled—most of the time the trunk may be empty or only partially filled, but at certain times, e.g. when travelling, the trunk 107 may be completely full. In a worst case scenario, the lid of the trunk may not be closed and remain open while driving. Such openings into the interior 100 of the vehicle, e.g., an open trunk 107, an open window or an open sunroof, cause the biggest changes in the secondary paths and may trigger the robustness control to the effect that the ANC system will be deactivated as long as this state remains, i.e., as long as the current secondary paths differ too greatly from the stored secondary path parameters.

The bigger the distance between the secondary source and the error microphone, the higher the risk of deviation of the RIR and hence the higher the risk of instability. In addition to this, a spectral dependency also exists in which the higher the frequency, the higher the risk of instability. Therefore, the wave length is also taken into consideration in the following.

Figure 2:
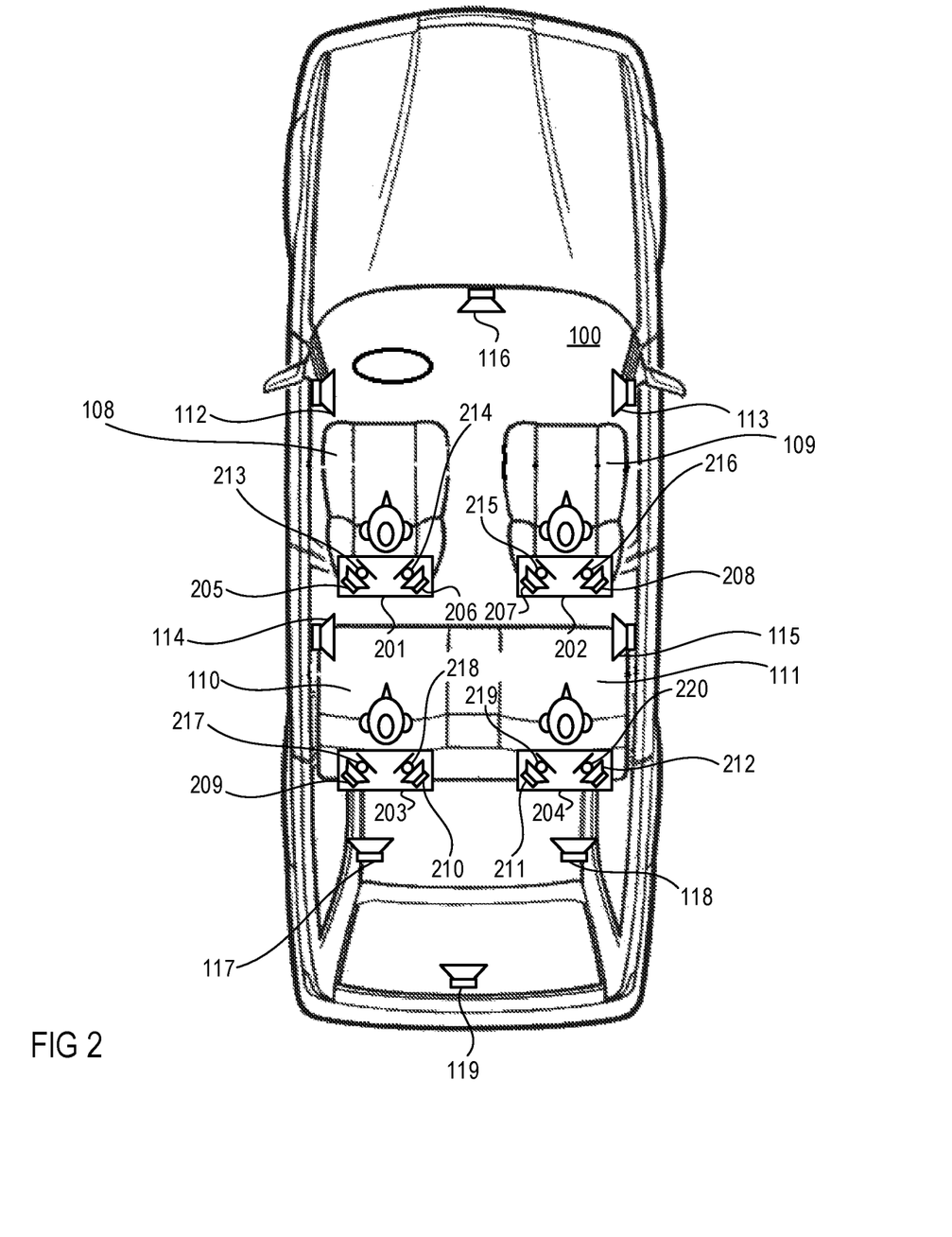
FIG. 2 is a top view of the setup shown in FIG. 1 with additional (active) headrest loudspeakers.

In order to extend the useful spectral range of operation of ANC systems, active headrests, i.e., headrests with loudspeakers and eventually microphones, may be employed as depicted in FIG. 2. Loudspeakers disposed in (four) headrests 201-204, referred to herein as headrest loudspeakers 205-212 in combination with the already existing system loudspeakers 112-119 are able to raise the upper cut-off frequency from previously f≈350 [Hz] (when only the system loudspeakers 112-119 are in use) to f≈500 [Hz] (when a combination of system loudspeakers 112-119 and headrest loudspeakers 205-212 is in use). Such a combination offers several merits. When error microphones 213-220 are installed in the headrests 201-204, the distance between them and the passenger's ears are minimized, regardless of the seat position, the size of the person, etc., since passengers usually adjust their seats, and thus the headrests, to their needs.

Moving the seats 108-111 is also no problem regarding the headrest loudspeakers 205-212, since they move together with the error microphones 213-220, leading to a constant RIR between the headrest loudspeakers and the error microphone in front of them. The influence of one active headrest to neighboring, active headrests can thereby be ignored, since the cross-talk cancellation (CTC) between different seats, and as such also between different active headrests, exceeds by far the range of the expected ANC performance. In view of the system loudspeakers, the situation worsens when the error microphones 213-220 are moved from the ceiling to the headrests 201-204, since their RIRs now change whenever the seats are moved. These deviations, however, should remain well inside the stability region and as such should not form any additional source of instability.

In common systems that combine active headrests with system loudspeakers, similar robustness improving measures are applied, i.e., once a stability problem had been detected, the whole system, as a consequence, was deactivated. Tests have revealed that the RIRs of active headrests are more or less immune against any kind of change in the ambience due to the close distance between the secondary source, i.e., secondary loudspeaker, and the corresponding error microphone, installed in front of the secondary loudspeaker. Regardless of whether a head is in contact with the headrest or not, practically no deviations in the spectral range of interest (below f≈1000 Hz) exceed given stability margins. Therefore, ANC systems solely based on active headrests can be considered as intrinsically robust and do not need any robustness improving measures, as opposed to systems based on system loudspeakers. Hence both systems may be decoupled from each other and form sub-systems of different robustness. More generally expressed, a system part may be separated, based on its robustness properties, to form a stand-alone system or a sub-system if there are parts in the complete system that exhibit a much higher or lower robustness.

Figure 3:
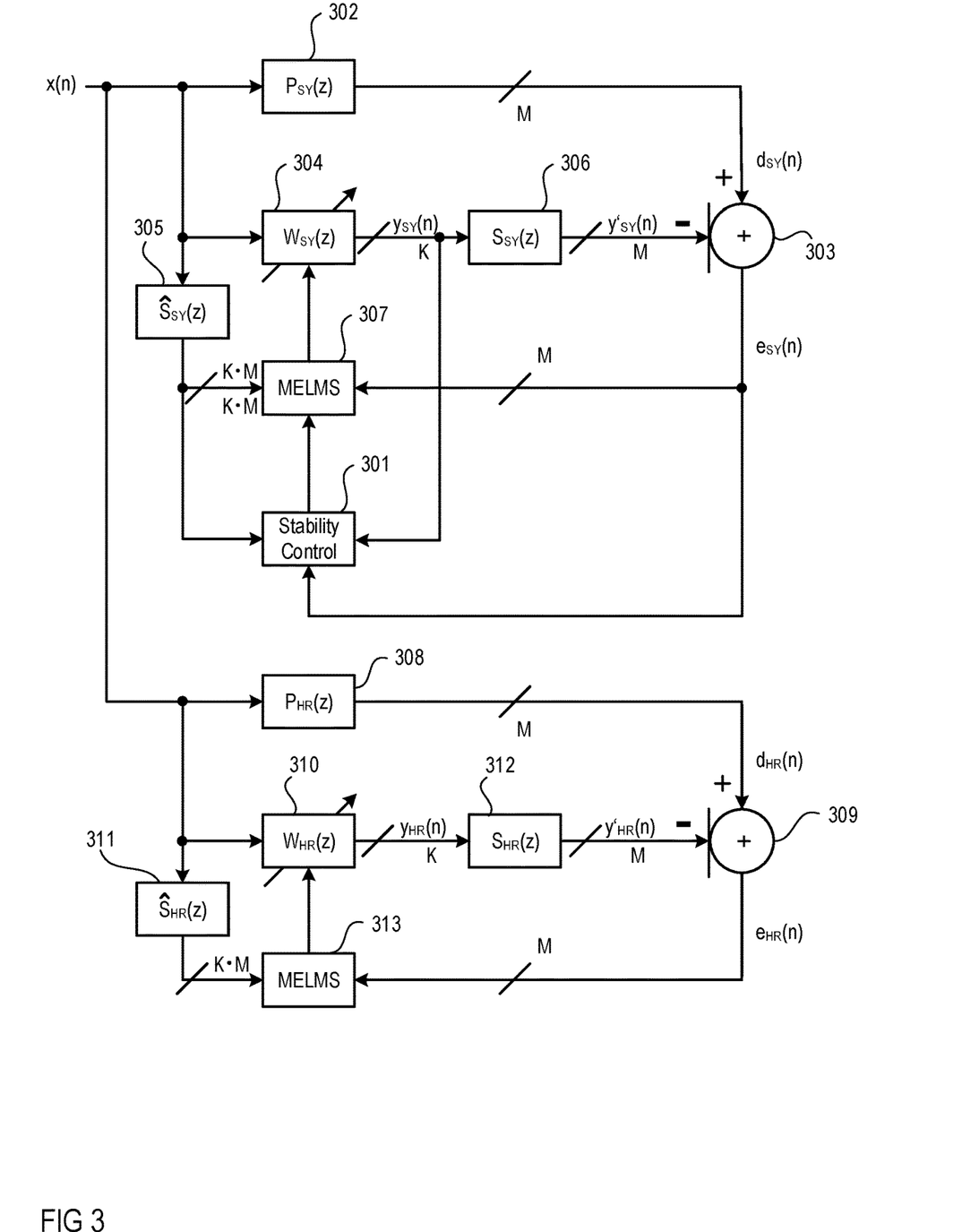
FIG. 3 is a signal flow diagram illustrating an exemplary ANC system with two sub-systems.

The exemplary ANC system shown in FIG. 3, includes a (more) robust sub-system (see blocks with index HR) that is connected upstream of the headrest loudspeakers and a less robust sub-system (see blocks with index SY) that is prone to becoming instable and has a certain need for robustness measures and that is connected upstream of the system loudspeakers. The less robust sub-system may be observed, for example, by a processing block referred to herein as "stability control block 301". The less robust sub-system may include a primary path 302 with a transfer function PSY(z) that generates from a (noise) reference input signal x(n), which may be a signal from a reference microphone, an accelerometer or a motor sound synthesizer in connection with an RPM sensor, M disturbing signals dSY(n) (noise) that are supplied to at least one error microphone 303. The reference signal x(n), which represents the noise to be cancelled, is further supplied to a controllable filter 304 with a controllable transfer function WSY(z) and a secondary path estimation filter 305 with a transfer function ŜSY(z). The secondary path estimation filter 305 models a secondary path 306 which has a transfer function SSY(z). The secondary path 306 generates, through signal transmission, M≥1 output anti-noise signals y'SY(n) from K≥1 input anti-noise signals ySY(n) provided by controllable filter 304 and supplies the M output anti-noise signals y'SY(n) to the at least one microphone 303. The K input anti-noise signals ySY(n) are also supplied to the stability control block 301.

The at least one error microphone 303 subtracts, in the acoustic domain, the M output anti-noise signals y'SY(n) from the M disturbing signals dSY(n) and provides therefrom, in the electrical domain, M error signals eSY(n) to the stability control block 301 and to a filter control block 307 that may employ a multiple error least mean square (MELMS) algorithm to control the controllable filter 304. The primary path 302 and the secondary path 306 operate in the acoustic domain and the secondary path 306 is supplied with acoustic signals by loudspeakers (not shown in FIG. 3), such as the system loudspeakers described above in connection with FIGS. 1 and 2, that transform electrical signals from previous blocks into acoustic signals. All other blocks in the less-robust sub-system operate in the electrical domain. The stability control block 301 and the filter control block 307 further receive the M error signals eSY(n) from the at least one error microphone 303 and K·M output signals from secondary path estimation filter 305.

The robust sub-system may include a primary path 308 with a transfer function PHR(z) that generates from the reference signal x(n) M disturbing signals dHR(n) (noise) that are supplied to at least one microphone 309. In some exemplary sub-systems, microphones 306 and 309 can be the same. The reference signal x(n) is further supplied to a controllable filter 310 with a controllable transfer function WHR(z) and a secondary path estimation filter 311 with a transfer function ŜHR(z). The secondary path estimation filter 311 models a secondary path 312 which has a transfer function SHR(z). The secondary path 312 generates M≥1 output anti-noise signals y'HR(n) from K≥1 input anti-noise signals yHR(n) provided by controllable filter 310 and provides the M output anti-noise signals y'HR(n) to the at least one microphone 309.

The at least one error microphone 309 subtracts in the acoustic domain the M output anti-noise signals y'HR(n) from the M disturbing signals dHR(n) and provides therefrom in the electrical domain M error signals eHR(n) to a filter control block 313 that may employ a multiple error least mean square (MELMS) algorithm to control the controllable filter 310. The primary path 308 and the secondary path 312 operate in the acoustic domain and are supplied with acoustic signals by loudspeakers (not shown in FIG. 3), such as the headrest loudspeakers described above in connection with FIG. 2, that transform electrical signals from previous blocks into acoustic signals. All other blocks in the robust sub-system operate in the electrical domain. The filter control block 313 further receives the M error signals eHR(n) from the at least one microphone 309 and K·M output signals from secondary path estimation filter 311.

Further, this combination of sub-systems can be adjusted in such a way that the less robust sub-system, which employs the system loudspeakers, only encompasses the (very) low spectral part, which cannot be covered by the headrest loudspeakers. Accordingly, the robustness of the system loudspeaker sub-system will be increased since the robustness becomes greater the lower the frequency. As a further consequence of processing only lower frequencies, the sampling rate can be reduced, allowing for savings in the processing load as well as in the memory consumption. Furthermore, by operating both systems at the same frequency (speed), a latency issue affecting the system loudspeaker sub-system due to the large distance of the secondary sources to the error microphones is reduced.

The intrinsically robust sub-system with the active headrests may be used as broadband as possible and may be employed as a stand-alone system if it per se provides sufficient robustness and spectral range. The total result is a system that essentially only includes the robust sub-system (as stand-alone system) or a combination of two ANC sub-systems of different robustness, leading to a total system that still covers the whole spectral range, if no stability problem occurs, or, if only the robust sub-system is in operation due to instability, a system which may not cover the whole spectral range (e.g., the lowest spectral areas may be excluded). Thus, keeping the intrinsically robust sub-system as broadband as possible, ideally allows to switch off instable sub-systems or to not use all corresponding loudspeakers (e.g. system loudspeakers), i.e., secondary paths which may create robustness problems.

Figure 4:
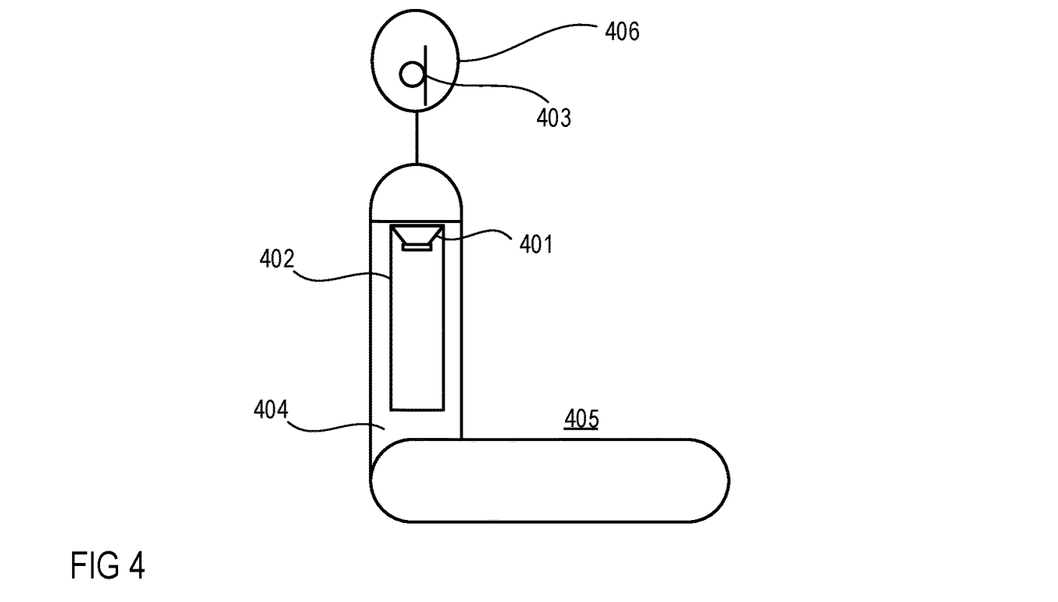
FIG. 4 is a side view of a loudspeaker microphone setup installed in the backrest of a seat with loudspeakers in an upturned position.
Figure 5:
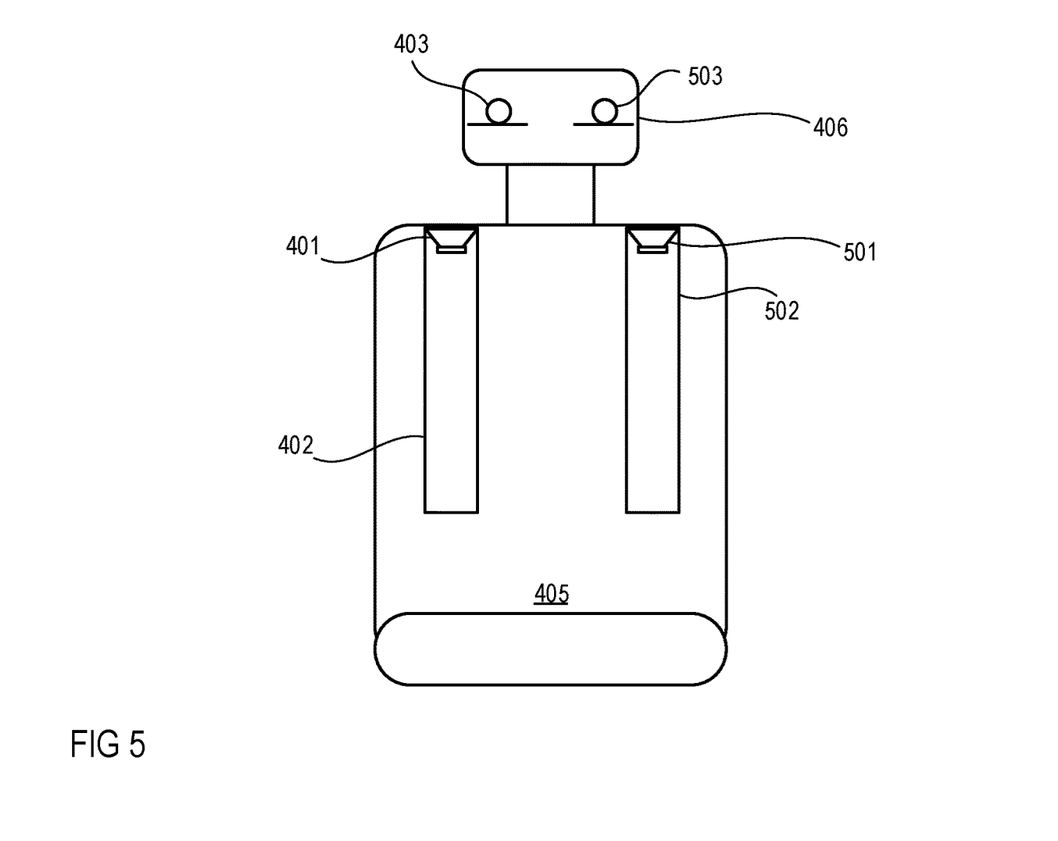
FIG. 5 is a front view of the loudspeaker setup shown in FIG. 4.

Since headrests usually do not provide a significant amount of useable acoustic volume, the possibilities to enlarge the useful ANC bandwidth of the intrinsically robust sub-system are limited. An option may be to integrate loudspeakers into, e.g., the shoulder areas of backrests of seats, as depicted in FIGS. 4 and 5, since the backrest of a seat offers a much larger usable volume for the loudspeakers and, due to its dimensions, affords the option of installing loudspeakers of larger size (larger membrane diameter), possibly also covering lower spectral ranges. Referring to FIGS. 4 and 5, two loudspeakers 401 and 501, each mounted in an (airtight) enclosure 402 and 502, respectively, are disposed in an upturned position (e.g., directed to the ceiling of a vehicle interior) in the upper left and right parts of a backrest 404 of a passenger seat 405 and below a headrest 406. Furthermore, microphones 403 and 503 (e.g., directed to the ceiling of the vehicle interior) may be disposed in or on the backrest 404 above the loudspeakers 401 and 501. Microphones 403 and 503 may be used (e.g., as the at least one error microphone 303 and/or 309) in connection with an ANC system, e.g., as shown in FIG. 3. The microphones 403 and 503 may be disposed in the headrest 406 in a position closest to a listener's ears.

Figure 6:
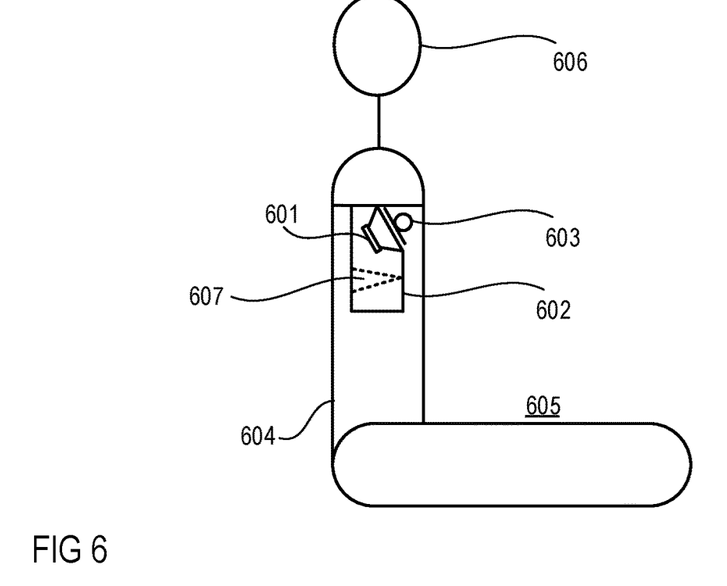
FIG. 6 is a side view of a loudspeaker microphone setup installed in the backrest of a seat with loudspeakers in a tilted position.
Figure 7:
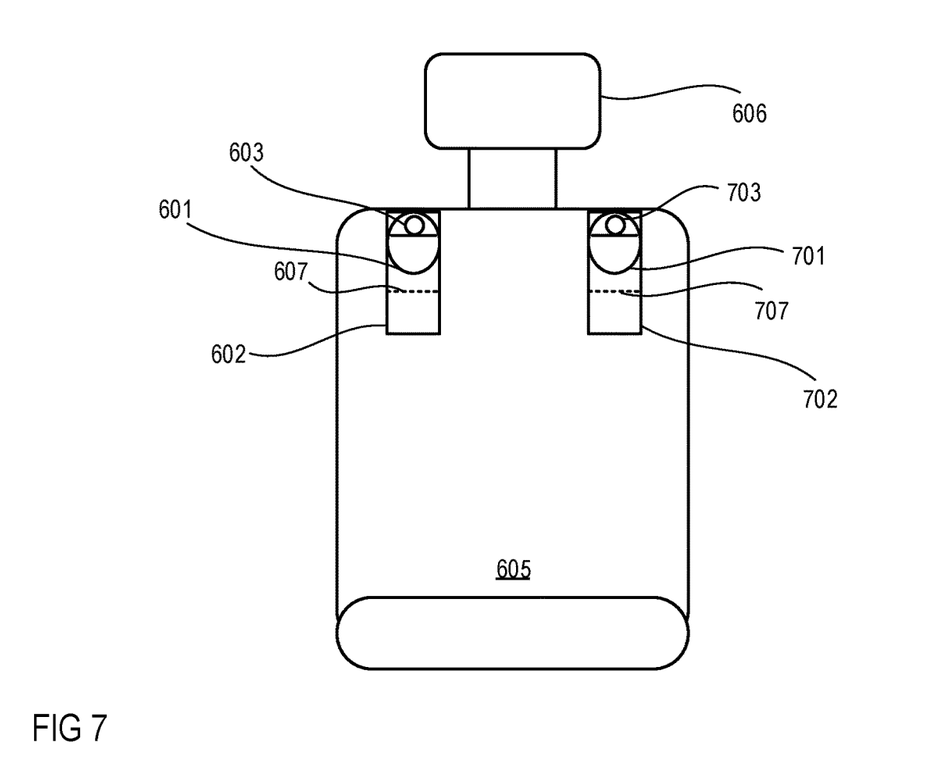
FIG. 7 is a front view of the loudspeaker setup shown in FIG. 6.

The useable membrane diameter of the backrest loudspeakers may be further increased by not mounting the loudspeakers horizontally into the shoulder area of the backrests, but by placing them somewhat tilted into the backrest, as shown in FIGS. 6 and 7. Furthermore, a kind of predetermined breaking point may be inserted into the housings (enclosures) of the loudspeakers, which may be important or even required for safety reasons since a horizontally installed loudspeaker would not yield easily in case of an impact. Referring to FIGS. 6 and 7, two loudspeakers 601 and 701, each mounted in an (airtight) enclosure 602 and 702, respectively, are disposed in an tilted position (e.g., directed to the upper front side of the seat under an oblique angle) in the upper left and right parts of a backrest 604 of a passenger seat 605 and below a headrest 606. Furthermore, microphones 603 and 703 (that may be directed to the upper front side of the seat under an oblique angle) may be disposed (in or) on the backrest 604 in front of the loudspeakers 601 and 701. The enclosures 602 and 702 may comprise predetermined breaking points such as indentations and tapers 607 and 707.

The bandwidth of an intrinsically robust ANC system may be enlarged by placing speakers in the backrest that are large enough to cover the whole spectral area of interest. This would lead to a single, intrinsically robust broadband solution of the ANC problem and no additional speakers would then be necessary (e.g., the system loudspeakers). The size of these loudspeakers may be increased and thus the useful spectral range extended towards lower frequencies if they are installed into the backrest of the seats in a tilted position.

At the same time, a predetermined breaking point could also be integrated into the housing of the loudspeakers, leading to a system with a higher grade of safety that would satisfy the strict safety standards of the automobile industry. Although the examples outlined above refer to vehicles, particularly cars, the exemplary systems and methods may be applied in connection with all kinds of ANC systems and methods with stability issues. The sub-systems described above in connection with FIG. 3 employ feedforward structures but other structures such as a sole feedback structure or a combination of feedforward and feedback structures (also referred to as hybrid structure) are applicable as well. Furthermore, loudspeakers disposed in the back rests and loudspeakers in the headrest may be combined to form specific groups of loudspeakers employed in robust broadband (sub-) systems.

The description of embodiments has been presented for purposes of illustration and description. Suitable modifications and variations to the embodiments may be performed in light of the above description or may be acquired by practicing the methods. For example, unless otherwise noted, one or more of the described methods may be performed by a suitable device and/or combination of devices. The above-described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

What is claimed is:

1. An active noise control system comprising:
   a first active noise control sub-system including at least one loudspeaker and at least one microphone;
   a second active noise control sub-system including at least one additional loudspeaker; and
   a seat with a headrest, the at least one loudspeaker being disposed within the headrest; wherein:
   a first distance between the at least one loudspeaker and the at least one microphone forms a first secondary path;
   a second distance between the at least one additional loudspeaker and the at least one microphone forms a second secondary path;
   the first distance is shorter than the second distance causing the first active noise control sub-system to have a higher robustness than the second active noise control sub-system; and
   the first active noise control sub-system comprises a filter control block connected upstream of the at least one loudspeaker disposed in the headrest; and
   a stability controller; wherein the stability controller evaluates a stability of the second active noise control sub-system and switches the second active noise control sub-system off or restricts an operation of the active noise control sub-system to lower frequencies when an instability condition of the second active noise control sub-system is detected.

2. The active noise control system of claim 1, wherein the at least one additional loudspeaker is disposed outside the headrest; wherein the second active noise control sub-system comprises an automatic noise sub-controller connected upstream of the at least one additional loudspeaker disposed outside the headrest.

3. The active noise control system of claim 1, wherein the at least one loudspeaker disposed within the headrest is positioned so that a main radiation axis of the at least one loudspeaker disposed within the headrest is directed to a listening position where a passenger's head would be when the passenger is sitting on the seat.

4. The active noise control system of claim 1, wherein the at least one microphone is disposed in an ambience of the at least one loudspeaker disposed within the headrest and connected upstream of the filter control block.

5. The active noise control system of claim 1, wherein the at least one loudspeaker disposed within the headrest has a main radiation axis; and the at least one loudspeaker disposed within the headrest is positioned so that the main radiation axis of the at least one loudspeaker disposed within the headrest is forward bound.

6. The active noise control system of claim 5, wherein the at least one loudspeaker disposed within the headrest is positioned so that the main radiation axis of the loudspeaker is directed to a listening position where a passenger's head would be when the passenger is sitting on the seat.

7. The active noise control system of claim 1, wherein at least one of the first active noise control sub-system and second active noise control sub-system receives a noise reference signal.

8. The active noise control system of claim 1 further including at least one additional microphone disposed in one of a backrest and the headrest.

9. An active noise control method comprising:
   generating with a first active noise control sub-system including at least one loudspeaker and at least one microphone, anti-noise that is configured to reduce or cancel noise occurring at a listening position; and
   generating with a second active noise control sub-system including at least one additional loudspeaker, anti-noise that is configured to reduce or cancel noise occurring at the listening position; wherein:
   a first distance between the at least one loudspeaker and the at least one microphone forms a first secondary path;
   a second distance between the at least one additional loudspeaker and the at least one microphone forms a second secondary path;
   the first distance is shorter than the second distance causing the first active noise control sub-system to have a higher robustness than the second active noise control sub-system;

the listening position is in an ambience of a seat with a headrest; the method further comprising:

generating the anti-noise to reduce or cancel noise occurring at the listening position;

radiating the anti-noise from within the headrest of the seat;

evaluating a stability of the second active noise control sub-system; and switching the second active noise control sub-system off or restricting an operation of the second active noise control sub system to lower frequencies when an instability condition of the second active noise control sub-system is detected.

10. The active noise control method of claim 9, further comprising:

generating additional anti-noise that is configured to reduce or cancel noise occurring at the listening position; and radiating the additional anti-noise from a position outside the headrest.

11. The active noise control method of claim 9, further including positioning at least one additional microphone in a one of a backrest and the headrest.

12. An active noise control system comprising:

a first active noise control sub-system including at least one loudspeaker positioned with a seat and at least one microphone;

a second active noise control sub-system including at least one additional loudspeaker; and a stability controller that evaluates a stability of the second active noise control sub-system and switches the second active noise control sub-system off or restricts an operation of the second active noise control sub-system to lower frequencies when an instability condition of the second active noise control sub-system is detected, wherein:

a first distance between the at least one loudspeaker and the at least one microphone forms a first secondary path;

a second distance between the at least one additional loudspeaker and the at least one additional microphone forms a second secondary path;

the first distance is shorter than the second distance causing the first active noise control sub-system to have a higher robustness than the second active noise control sub-system;

the seat includes a headrest, the at least one loudspeaker being disposed within the headrest; and the first active noise control sub-system comprises a filter control block connected upstream of the at least one loudspeaker disposed in the headrest.

13. The active noise control system of claim 12, wherein the at least one additional loudspeaker is disposed outside the headrest; and wherein the second active noise control sub-system comprises an automatic noise sub-controller connected upstream of the at least one additional loudspeaker disposed outside the headrest.

14. The active noise control system of claim 12, wherein the at least one loudspeaker disposed within the headrest is positioned so that a main radiation axis of the at least one loudspeaker disposed within the headrest is directed to a listening position where a passenger's head would be when the passenger is sitting on the seat.

15. The active noise control system of claim 12, wherein the at least one microphone is disposed in an ambience of the at least one loudspeaker disposed within the headrest and connected upstream of the filter control block.

16. The active noise control system of claim 12, further including at least one additional microphone disposed in one of a backrest and the headrest.

17. An active noise control system comprising:

a first active noise control sub-system including at least one loudspeaker and at least one microphone;

a second active noise control sub-system including at least one additional loudspeaker; and a seat with a headrest, the at least one loudspeaker being disposed within the headrest; wherein:

a first distance between the at least one loudspeaker and the at least one microphone forms a first secondary path;

a second distance between the at least one additional loudspeaker and the at least one microphone forms a second secondary path;

the first distance is shorter than the second distance causing the first active noise control sub-system to have a higher robustness than the second active noise control sub-system;

the first active noise control sub-system comprises a filter control block connected upstream of the at least one loudspeaker disposed in the headrest; and the at least one additional loudspeaker is disposed outside the headrest; wherein the second active noise control sub-system comprises an automatic noise sub-controller connected upstream of the at least one additional loudspeaker disposed outside the headrest.

* * * * *